(12) United States Patent
Phillips et al.

(10) Patent No.: US 10,630,327 B2
(45) Date of Patent: *Apr. 21, 2020

(54) UPLINK NOISE MINIMIZATION

(71) Applicant: CommScope Technologies LLC, Hickory, NC (US)

(72) Inventors: Fred William Phillips, Forest, VA (US); Christopher Goodman Ranson, Concord, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,779

(22) Filed: Apr. 9, 2018

(65) Prior Publication Data
US 2018/0227004 A1    Aug. 9, 2018

Related U.S. Application Data

(63) Continuation of application No. 15/483,771, filed on Apr. 10, 2017, now Pat. No. 9,941,915, which is a
(Continued)

(51) Int. Cl.
*H04B 1/10* (2006.01)
*H04W 52/14* (2009.01)
(Continued)

(52) U.S. Cl.
CPC ......... *H04B 1/1027* (2013.01); *H04B 7/0632* (2013.01); *H04W 52/146* (2013.01);
(Continued)

(58) Field of Classification Search
CPC ... H04W 52/52; H04W 52/146; H04W 52/46; H04B 1/1027
(Continued)

(56) References Cited

U.S. PATENT DOCUMENTS 6,275,484 B1    8/2001  Lynch et al.
6,801,767 B1    10/2004 Schwartz et al.
(Continued)

FOREIGN PATENT DOCUMENTS

EP    1689099 A1    8/2006
JP    1004122 A     1/1989
(Continued)

OTHER PUBLICATIONS

Borkowski et al., "Utilization of an Indoor DAS for Repeater Deployment in WCDMA", "Institute of Communication Engineering, Tampere University of Technology, Vehicular Technology Conference May 7-10, 2006", May 7, 2006, pp. 111-116, vol. 3, Publisher: IEEE, Published in: Tampere, Finland.
(Continued)

*Primary Examiner* — John J Lee
(74) *Attorney, Agent, or Firm* — Fogg & Powers LLC

(57) ABSTRACT

A system comprising circuitry configured to: communicate with a base station; and adjust an uplink gain applied to uplink signals communicated from the system to the base station based on an evaluation of (1) a noise contribution from the system that is presented to the base station and (2) a receive noise floor for the base station.

20 Claims, 8 Drawing Sheets

Related U.S. Application Data continuation of application No. 15/201,069, filed on Jul. 1, 2016, now Pat. No. 9,622,199, which is a continuation of application No. 14/874,891, filed on Oct. 5, 2015, now Pat. No. 9,386,546, which is a continuation of application No. 13/705,814, filed on Dec. 5, 2012, now Pat. No. 9,155,055, which is a continuation of application No. PCT/US2011/039592, filed on Jun. 8, 2011.

(60) Provisional application No. 61/352,851, filed on Jun. 9, 2010.

(51) Int. Cl.
*H04W 88/08* (2009.01)
*H04W 52/46* (2009.01)
*H04W 52/52* (2009.01)
*H04B 7/06* (2006.01)
*H04W 52/24* (2009.01)

(52) U.S. Cl.
CPC ....... *H04W 52/241* (2013.01); *H04W 52/242* (2013.01); *H04W 52/46* (2013.01); *H04W 52/52* (2013.01); *H04W 88/085* (2013.01)

(58) Field of Classification Search
USPC ...... 455/501, 562.1, 127.2, 500, 63.1, 67.11, 455/67.13, 69, 127.1, 136, 66.1, 522, 11.1
See application file for complete search history.

(56) References Cited

U.S. PATENT DOCUMENTS

| | | | |
|---|---|---|---|
| 6,990,313 B1* | 1/2006 | Yarkosky | H04B 7/15535 455/11.1 |
| 7,035,671 B2 | 4/2006 | Solum | |
| 7,505,747 B2 | 3/2009 | Solum | |
| 7,512,419 B2 | 3/2009 | Solum | |
| 7,555,261 B2 | 6/2009 | O'Neill | |
| 7,962,111 B2 | 6/2011 | Solum | |
| 7,974,244 B2 | 7/2011 | Hermel | |
| 8,116,254 B2 | 2/2012 | Sabat et al. | |
| 8,310,963 B2 | 11/2012 | Singh | |
| 8,447,230 B2 | 5/2013 | Mohebbi | |
| 8,626,245 B2 | 1/2014 | Zavadsky et al. | |
| 9,155,055 B2 | 10/2015 | Phillips et al. | |
| 9,386,546 B2 | 7/2016 | Phillips et al. | |
| 9,622,199 B2 | 4/2017 | Phillips et al. | |
| 9,941,915 B2 | 4/2018 | Phillips et al. | |
| 2003/0211828 A1* | 11/2003 | Dalgleish | H04B 7/15535 455/11.1 |
| 2007/0268846 A1 | 11/2007 | Proctor, Jr. et al. | |
| 2008/0198775 A1 | 8/2008 | Nejatian | |
| 2008/0198955 A1* | 8/2008 | Oren | H04B 7/0874 375/347 |
| 2008/0200117 A1 | 8/2008 | Oren et al. | |
| 2008/0299897 A1 | 12/2008 | Mohebbi | |
| 2009/0316609 A1 | 12/2009 | Singh | |
| 2013/0252651 A1* | 9/2013 | Zavadsky | H04B 7/0842 455/501 |

FOREIGN PATENT DOCUMENTS

| | | |
|---|---|---|
| WO | 03044970 A2 | 5/2003 |
| WO | 2003044970 A3 | 3/2005 |
| WO | 2011156465 A1 | 12/2011 |

OTHER PUBLICATIONS

European Patent Office, "Communication pursuant to Rule 94(3) from EP Application No. 11727594.1 dated Sep. 18, 2017", from Foreign Counterpart to U.S. Appl. No. 13/705,814, filed Sep. 18, 2017, pp. 1-7, Published: EP.

European Patent Office, "Communication under Rule 71(3) from EP Application No. 11727594.1 dated Jun. 11, 2018", from Foreign Counterpart to U.S. Appl. No. 13/705,814, filed Jun. 11, 2018, pp. 1-42, Published: EP.

European Patent Office, "Extended European Search Report from EP Application No. 18208656.1 dated Apr. 4, 2019", from Foreign Counterpart to U.S. Appl. No. 13/705,814, pp. 1-9, Published: EP.

International Searching Authority, "Written Opinion of the International Searching Authority from PCT Application No. PCT/US2011/039592 dated Aug. 31, 2011", from Foreign Counterpart to U.S. Appl. No. 13/705,814, filed Aug. 31, 2011, pp. 1-8, Published: EP.

Nikolopoulos et al., "Deselection of Antenna Elements for Avoiding Blocking Effects", "Antennas and Propagation, 2003 (ICAP 2003), Twelfth International Conference on (Conf. Pub. No. 491) Mar. 31, 2003-Apr. 3, 2003", Mar. 31, 2003, pp. 203-206, vol. 1.

U.S. Patent and Trademark Office, "Notice of Allowance", U.S. Appl. No. 13/705,814, filed Jun. 8, 2015, pp. 1-7, Published: US.

U.S. Patent and Trademark Office, "Notice of Allowance", U.S. Appl. No. 14/874,891, filed Mar. 8, 2016, pp. 1-12, Published: US.

U.S. Patent and Trademark Office, "Notice of Allowance", U.S. Appl. No. 15/201,069, filed Dec. 2, 2016, pp. 1-14, Published: US.

U.S. Patent and Trademark Office, "Notice of Allowance", U.S. Appl. No. 15/483,771, filed Dec. 1, 2017, pp. 1-18, Published: US.

U.S. Patent and Trademark Office, "Office Action", U.S. Appl. No. 13/705,814, filed Feb. 17, 2015, pp. 1-13, Published: US.

U.S. Patent and Trademark Office, "Office Action", U.S. Appl. No. 14/874,891, filed Nov. 5, 2015, pp. 1-8, Published: US.

U.S. Patent and Trademark Office, "Office Action", U.S. Appl. No. 15/201,069, filed Aug. 15, 2016, pp. 1-8, Published: US.

U.S. Patent and Trademark Office, "Office Action", U.S. Appl. No. 15/483,771, filed May 18, 2017, pp. 1-8, Published: US.

U.S. Patent and Trademark Office, "Supplemental Notice of Allowability", U.S. Appl. No. 15/201,069, filed Mar. 20, 2017, pp. 1-5, Published: US.

* cited by examiner

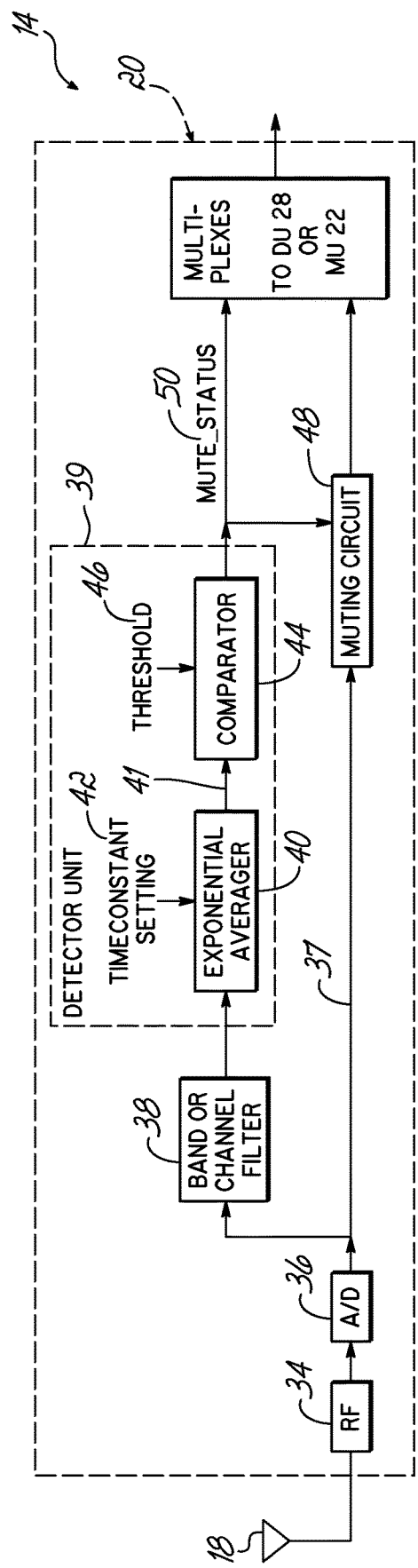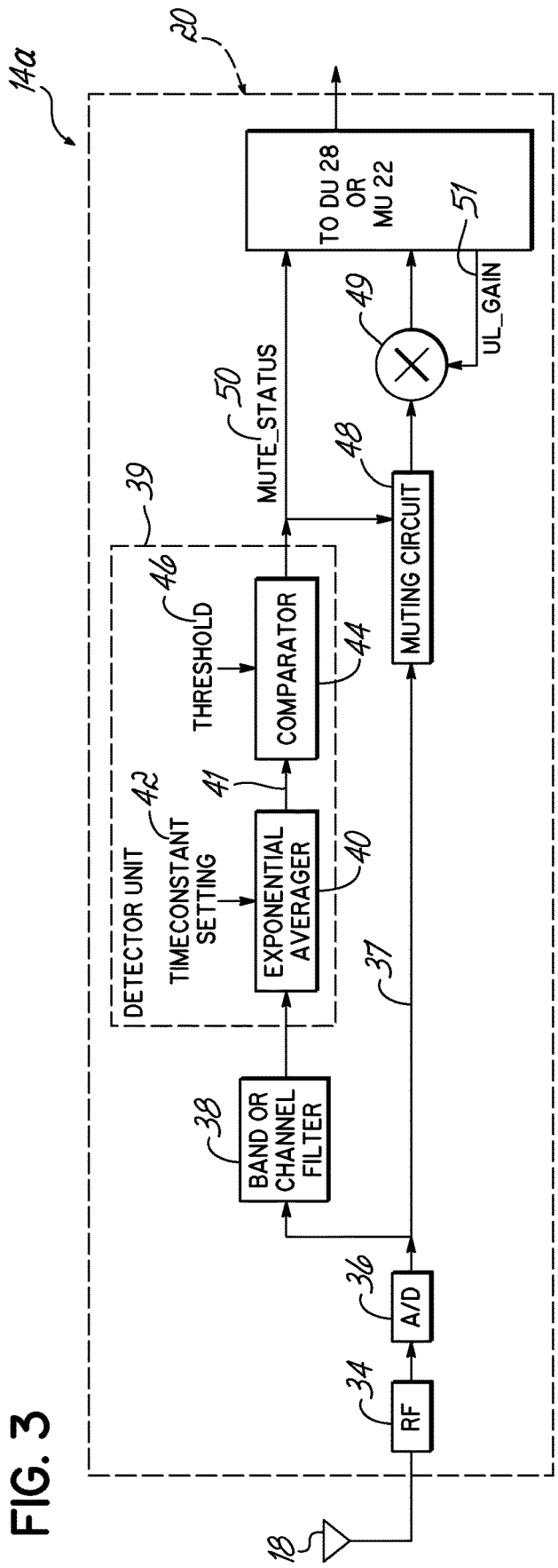

UPLINK NOISE MINIMIZATION

CROSS-REFERENCE TO RELATED APPLICATIONS

This Application is a continuation of U.S. application Ser. No. 15/483,771, filed Apr. 10, 2017 and entitled "UPLINK NOISE MINIMIZATION", which is a continuation of U.S. application Ser. No. 15/201,069, filed Jul. 1, 2016 and entitled "UPLINK NOISE MINIMIZATION" (which issued as U.S. Pat. No. 9,622,199), which is a continuation of U.S. application Ser. No. 14/874,891, filed Oct. 5, 2015 and entitled "UPLINK NOISE MINIMIZATION" (which issued as U.S. Pat. No. 9,386,546), which is a continuation of U.S. application Ser. No. 13/705,814, filed Dec. 5, 2012 and entitled "UPLINK NOISE MINIMIZATION" (which issued as U.S. Pat. No. 9,155,055), which is a continuation of and claims priority to International Application No. PCT/US2011/039592, filed Jun. 8, 2011 and entitled "UPLINK NOISE MINIMIZATION", which in turn claims priority to U.S. Provisional Patent Application Ser. No. 61/352,851 filed Jun. 9, 2010 and entitled "UPLINK NOISE MINIMIZATION", each of the applications and disclosures of which are incorporated herein by reference in their entireties.

FIELD OF THE INVENTION

The present invention relates generally to signal repeating systems, such as repeaters or distributed antenna systems, for wireless communications.

BACKGROUND OF THE INVENTION

In existing wireless technologies, signal repeating devices and systems, such as repeaters or distributed antenna systems ("DAS"), are used to extend the coverage of an overall wireless system beyond the range of traditional base stations. For example, an overall cellular or wireless communication system may consist of a plurality of base transceiver stations ("BTS") or base stations that communicate with each other and with mobile user devices, such as cellular mobile phones, to provide a defined coverage area. In such coverage areas, there are often smaller geographical areas that have very low signal coverage, as provided by one or more of the base stations. For example, such areas of low signal coverage may be within buildings or in areas that are otherwise obstructed, such as by terrain features or man-made structures. Rather than simply implementing another costly and large base station in the area to provide coverage in such low signal areas, repeaters and distributed antenna systems are often utilized.

The distributed antenna system receives downlink signals from one or more donor base stations and distributes those signals via cable, such as fiber optics, coaxial cables, or copper twisted pair cable, throughout a building or other coverage area. At designated access points in the system, remote units amplify the downlink signals and transmit them to user equipment, such as mobile phones over radiating antennas. At those same access points, uplink signals are received by the remote units from mobile users, and the uplink signals are amplified, filtered and sent back through the distributed antenna system, where they are summed together and transmitted to the donor base station.

Many challenges exist with contemporary distributed antenna systems, one of which is maintaining a suitable noise floor in the system. Summing of the uplink signals from the various multiple remote units cumulatively adds the noise floors of each of the remote units. For example, a large system with 100 remote units summed together may raise the noise floor approximately 20 dB relative to the noise floor of a single remote unit. In order to compensate for the rise in the noise floor of the system, the mobile units interacting through the system must increase their transmit power. Based on the above example of a 20 dB rise in the noise floor, the mobile units will therefore need to increase their power by 20 dB in order to maintain a minimum acceptable carrier to noise ratio (C/N) coming out of the distributed antenna system. Since mobile units have a limited amount of transmit power that they can generate, this required increase in transmit power for the repeating system ultimately decreases range of the mobiles or the maximum distance from the remote unit of the distributed antenna system that the mobile unit can effectively communicate.

An additional challenge caused by the large noise floor rise is base station desensitization. Depending on path loss to the base station from the remote system, the noise floor contributed from the distributed antenna system could arrive at the base station at a higher level than the base station's own noise floor. When this occurs, the base station will be desensitized, potentially resulting in a shrinking coverage area for the base station. To assist in preventing the loss of coverage area, the uplink gain of the distributed antenna system should be set to a fairly low value to assure that the received noise floor from the distributed antenna system arrives at a level below the base station's own noise floor. For example, the distributed antenna system gain might be set such that the distributed antenna system noise floor arrives at the base station approximately 10 dB below the base stations own noise floor. In this situation, adding the distributed antenna system noise to the base station noise will result in only about a 0.4 dB rise in the overall floor noise at the base station receiver.

From the perspective of the mobile unit in the distributed antenna system having 100 remotes units, a 20 dB rise in the noise floor, as described above, requires the mobile units to increase their transmit power by 20 dB. The mobile units must also increase their power another 10.4 dB to overcome the base station noise floor which is 10.4 dB above the distributed antenna system noise floor. This further reduces the distance from the respective remote unit that mobile units can communicate.

To improve this situation, a squelch or muting can be applied to the uplink of any remote unit that has no traffic. This generally assists in decreasing the distributed antenna system noise rise and, for the example above, may also assist in decreasing the 0.4 dB noise rise at the base station. However, the mobile units can only decrease their transmit power a few tenths of a dB (0.4 dB max for the above example) in order to maintain the same C/N ratio at the base station. Therefore, while muting one or more remotes do assist in reducing base station desensitization slightly, it does not allow the mobile unit to significantly decrease its transmit power. Therefore, such a feature does not address the problems noted above or significantly increase the range of a distributed antenna system remote unit.

Embodiments of the present invention address these and other challenges in the prior art as discussed further below, and provide a significant advantage over contemporary distributed antenna systems having a large number of remote units.

SUMMARY OF THE INVENTION

Embodiments of the invention address the need in the art by providing a method of gain adjustment in a distributed antenna system having a master unit and a plurality of remote units. A noise condition of the distributed antenna system is monitored, and the uplink gain within the distributed antenna system that is applied to uplink signals to a base station, is dynamically adjusted based on the monitored noise condition. In one embodiment, the monitoring of a noise condition includes monitoring one or more remote units of the plurality of remote units and determining if the remote unit is active status or mute status. The uplink gain is dynamically adjusted by increasing the uplink gain in response to a decrease in the number of remote units that are active status, and decreasing the uplink gain in response to an increase in the number of remote units that are active status.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3 is a schematic diagram of an embodiment of a remote unit of a DAS system consistent with the invention.

FIG. 3A is a schematic diagram of an alternative embodiment of a remote unit of a DAS system consistent with the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention is directed to a method and apparatus for controlling uplink signal power in a distributed antenna system that has a master unit and a plurality of remote units. The master unit is coupled with a base station, and the remote units are coupled with the master unit. The invention includes monitoring of a noise condition of a distributed antenna system, and dynamically adjusting an uplink gain within the distributed antenna system, that is applied to uplink signals to a base station, based upon the monitored noise condition. In one exemplary embodiment, the number of active status remote units is determined, and the uplink gain is dynamically adjusted by increasing the uplink gain in response to a decrease in the number of remote units that are active status, and decreasing the uplink gain in response to an increase in the number of remote units that are active status. Other embodiments of the invention, as set forth herein, are also contemplated in the invention.

Figure 1:
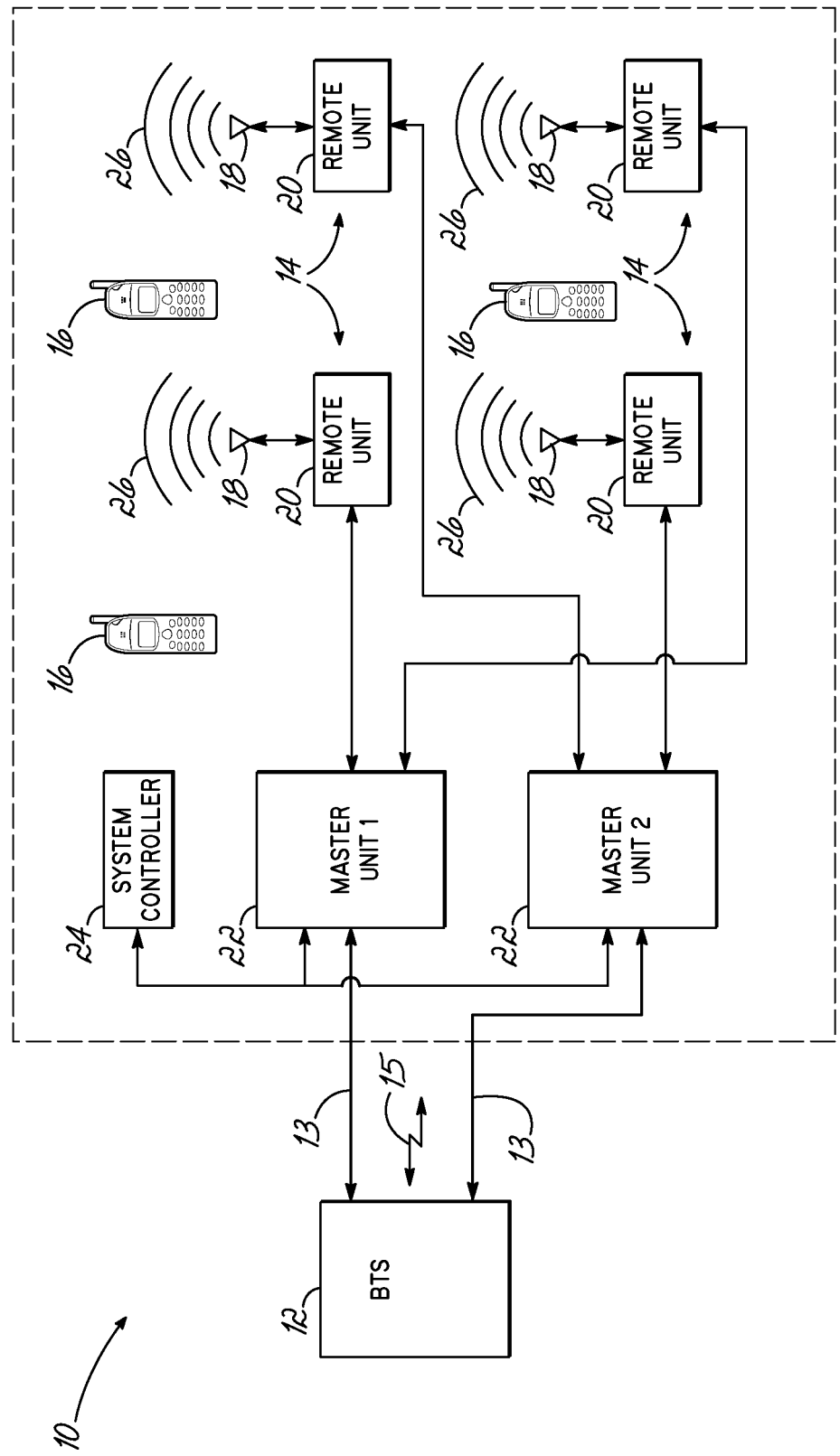
FIG. 1 is a schematic diagram of an exemplary distributed antenna system.

An exemplary distributed antenna system (DAS) 10 for implementing the invention may be appropriately coupled to one or more base transceiver stations (BTS), such as BTS 12 in a wired 13 or wireless 15 fashion as illustrated in the in FIG. 1. The distributed antenna system 10 might be incorporated into a building environment or other suitable environment and will generally include a number of remote antenna units or remote units 14 that are distributed in the environment to provide wireless signal coverage within a specific service area of the DAS 10. In that way, the remote antenna units 14 service a number of different mobile units/devices or other user equipment (UE) devices 16 operating in the environment of the DAS 10. Generally, each remote antenna unit 14 typically includes one or more antennas 18 and suitable electronics 20. A simple antenna 18 is illustrated in the figures. However, the invention is equally applicable in distributed antenna systems using multiple input multiple out (MIMO) technology. Therefore, in such a MIMO system, element 18 would be reflective of multiple antennas at the remote units.

Remote antenna units 14 are coupled generally to one or more master units 22, which combine and process the signals from the multiple remote antenna units 14 to interface appropriately with the BTS 12. The master unit interface to the BTS 12 may be wireless or in a wired arrangement. A system controller 24 controls the operation of each of the master units 22 for handling and processing the various signals 26 associated with the remote antenna units 14. The signals 26 associated with the remote antenna units 14 are reflective of uplink and downlink signals of the DAS 10 for communicating with mobile units 16. Such a DAS 10 may incorporate any number of remote antenna units 14 and master units 22, and thus, would not be limited to the illustrated example shown in FIG. 1.

Furthermore, the DAS might implement one or more extension units or distribution (See FIG. 2B) or other units which couple to various remote units 14 to combine or aggregate signals from the remote units before they are passed to the master units 22. Therefore, the present invention is not limited to direct links between the master units 22 and remote units 14 but rather is also applicable to systems using other elements that combine signals from the remote units 14 and are coupled between the master units 22 and remote units 14.

Embodiments of the invention optimize the performance of the distributed antenna system having many remote units such as DAS 10 in FIG. 1. As discussed above, the practice of muting one or more of the remote units assists in lowering a noise floor of the DAS 10. However, the muting of the remote units does not necessarily allow the mobile devices 16 to significantly reduce their power. Nor does the practice of remote unit muting improve the remote unit's 14 coverage area. Embodiments of the invention dynamically change or adjust an uplink gain of the DAS 10 or some portion of the DAS 10 as a function of the change or variation in a noise condition in the DAS, such as a change or variation in the DAS 10 noise floor. Various different conditions may cause a drop in the noise floor of the DAS. For example, a drop in the noise floor may be due to muting of the remote units in some embodiments. In other embodiments a noise floor drop may result from squelching or muting unused frequency bands or unused frequency subbands in one or more remote units 14.

In accordance with one embodiment of the invention for a particular incremental change in the noise condition, the uplink gain is dynamically and incrementally adjusted. For example, for each 1 dB decrease in the DAS 10 noise floor, the uplink gain for the DAS may be dynamically increased by 1 dB. Increasing uplink gain, in accordance with the invention, assists the mobile units in being able to reduce their transmit power by the same amount in dB as the uplink gain increases. Increasing the uplink gain is also beneficial in increasing a receive range of the remote units.

Figure 2A:
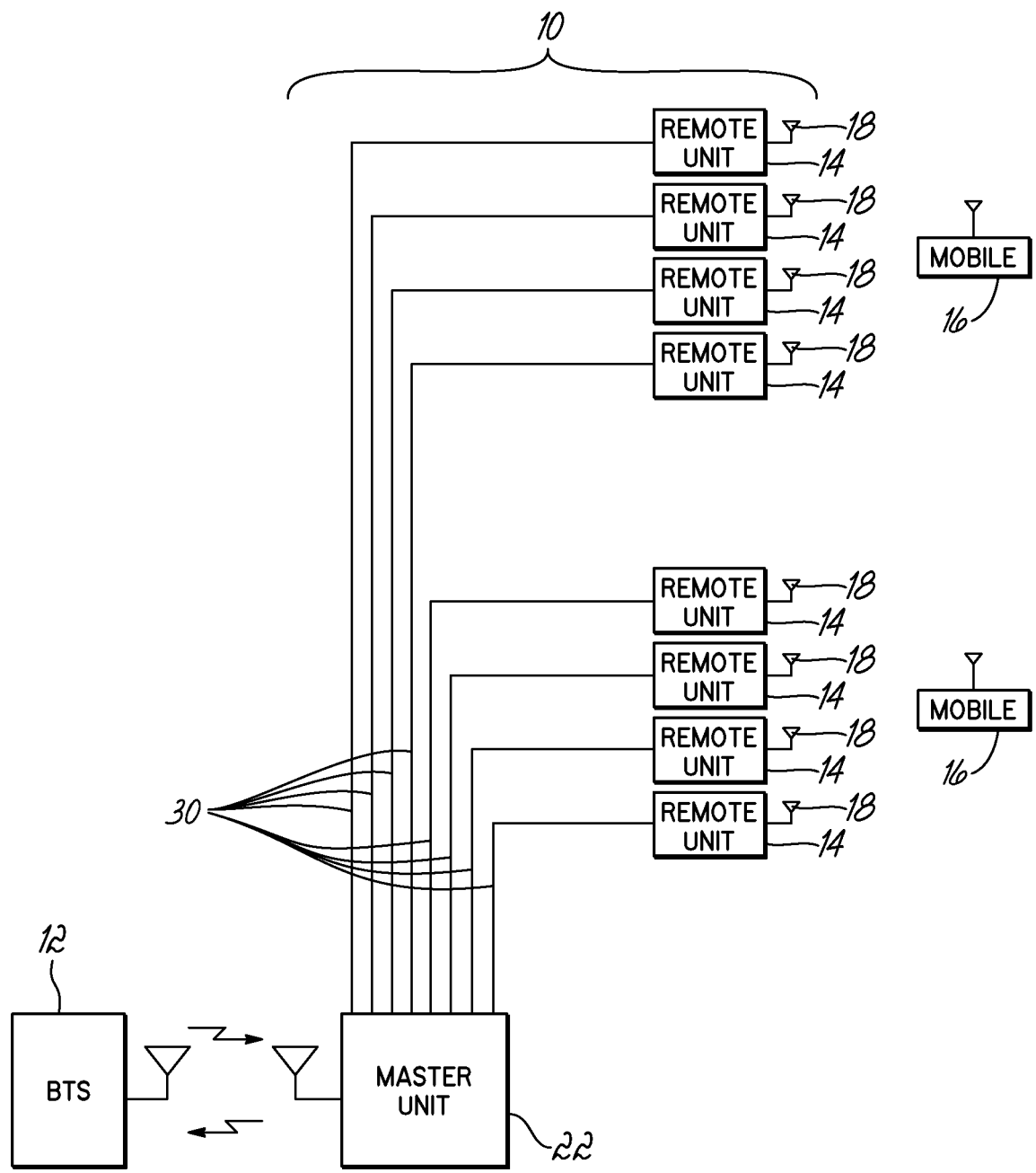
FIG. 2A is a schematic diagram of an exemplary distributed antenna system with multiple remote units consistent with embodiments of the invention.

FIG. 2A illustrates an exemplary signal repeating system that may incorporate embodiments of the invention. Specifically, FIG. 2A illustrates a schematic diagram for an exemplary distributed antenna system 10. Similar to the exemplary system in FIG. 1, the DAS 10 may be appropriately coupled to one or more base stations, such as base station 12, in a wired or wireless fashion. The DAS may include a number of remote antenna units 14, which are distributed in an environment to provide signal coverage within a service area of the DAS 10. In that way, the remote antenna units 14 service a number of different mobile devices 16 operating in the environment of the DAS 10. Remote antenna units 14 are generally coupled to one or more master units ("MU") 22, which combine and process the signals from the remote antenna units 14 to interface appropriately with the base station 12.

Figure 2B:
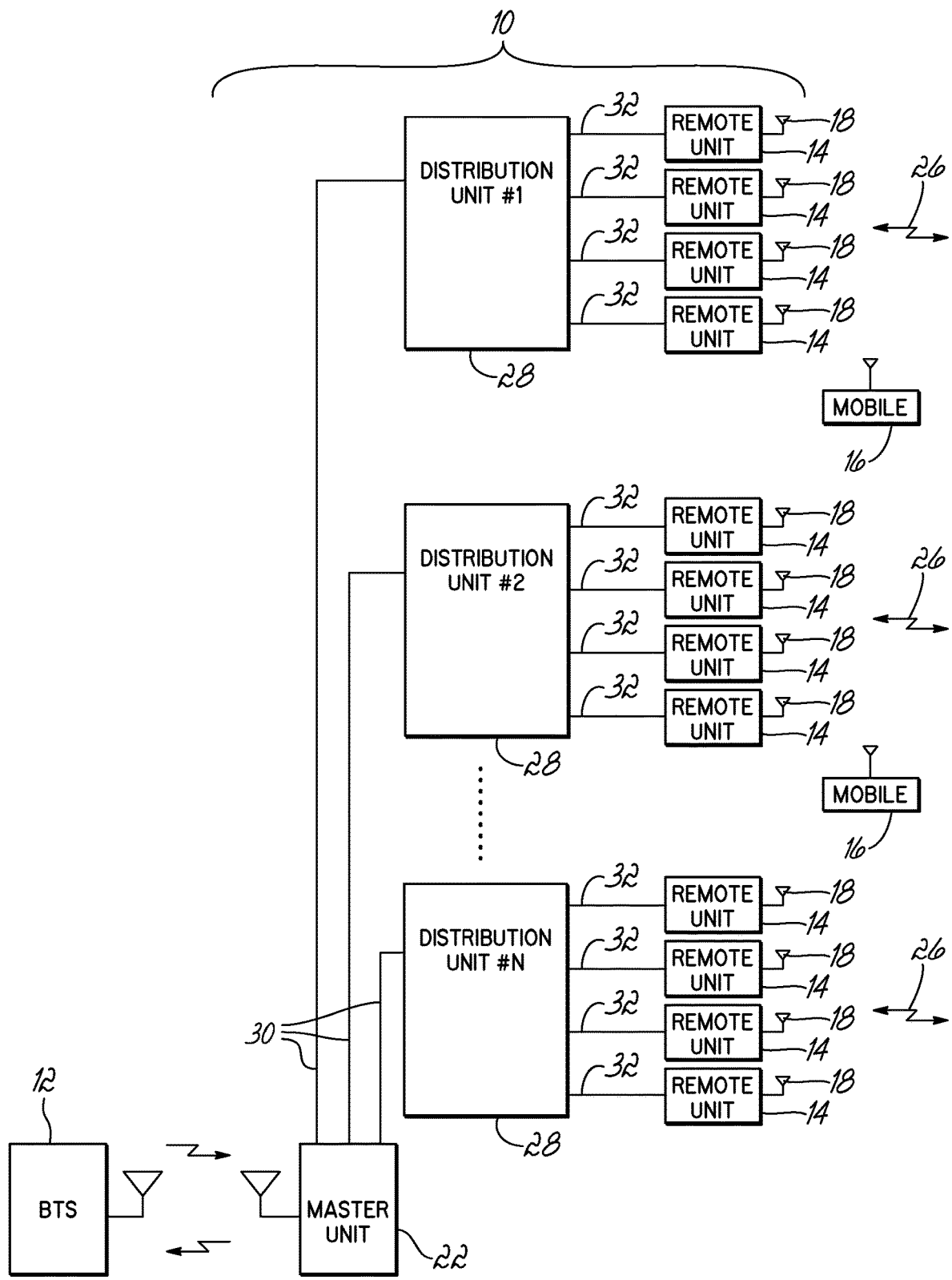
FIG. 2B is a schematic diagram of an alternate exemplary distributed antenna system with distribution units and multiple remote units consistent with embodiments of the invention.

FIG. 2B illustrates an alternate embodiment of a DAS 10 including one or more distribution units that interface with the remote units 14. As shown in FIG. 2B, one or more distribution units 28 ("DU") may be coupled between remote units 14 and the master unit 22. The distribution unit 28 is generally responsible for summing the signals in the uplink direction ("UL") from the plurality of mobile units 16 that interface with remote units 14. The signals 26 of the remote antenna units 14 are reflective of the uplink and downlink signals of the DAS 10 for communicating with the mobile units 16. The uplink and downlink signals are transceived between the remote units 14, the distribution units 28, and the master units 22 over suitable transmission media 30, 32, such as optical fiber, coaxial cable, and/or twisted pair cables, though other wired or wireless transmission media may also be used in accordance with the invention. While a single master unit 22 is shown in FIGS. 2A and 2B, embodiments of the invention may incorporate any number of remote antenna units 14, distribution units 28, and/or master units 22, and thus, would not be limited to the illustrated examples shown in FIGS. 2A and 2B.

Each active remote unit 14 that is operating, such as by transceiving signals with a mobile unit 16 and handling signal traffic, contributes to the overall noise condition and floor of the DAS 10. Such a remote unit is considered active or in "active" status. Muting or inactivating a remote unit 14 decreases the DAS 10 total noise floor by some incremental amount, which may be a known increment. The remote is then in "mute" status of inactive status. The remote units pass between active status and mute status, depending on the signal traffic. Conversely, use of the remote unit 14 to pass uplink signals to the master unit 22 increases the DAS 10 total noise floor generally by the same increment. To assist the master unit 22 in determining the number of active remote units 14, the remote unit 14 is configured to report a mute status or active status to the master unit 22, such as through a status signal. In other embodiments, instead of reporting a mute status of a remote unit, the mute status may be determined based on a level of data received from a remote unit 14 at the master unit 22 or even at the distribution unit 28. In one embodiment of the invention, the decision on whether to consider a remote in mute or active status may generally be based on detection of uplink signals from mobile units 16. For example, the received signals from mobile devices 16 and traffic therefrom may be detected using RSSI based detection techniques or other detection techniques as set out further below.

Each master unit 22 attempts to maintain a target noise floor or condition for the DAS system such that the target noise floor for the master unit 22 and DAS system 10 plus a path loss from the master unit 22 to the base station 12, is lower than or below the noise floor of the base station 12 by a predetermined threshold amount (e.g. 10 dB). The master unit 22 noise floor perceived by the base station is affected by and may be determined from the gain that is applied by the master unit 22, in addition to the overall DAS 10 noise floor. As explained above, the overall DAS 10 noise floor is affected by and may be determined by the number of active status remote units 14 transmitting uplink signals from one or more mobile units 16 in the active area or space of the DAS 10.

An initial uplink gain level or baseline uplink gain of the distributed antenna system 10 may be determined by the master unit 22. That baseline uplink gain might be confirmed during setup of the DAS 10 and may be based on the number of remote units 14 in the system as well as the path loss back to the base station 12 from the master unit 22. Any changes to the gain applied by the master unit 22 to the uplink signals are then constrained by the master unit 22 target noise floor. The DAS gain is chosen to put the DAS noise floor below the BTS receive noise floor by some pre-determined threshold amount, such as 10 dB, as noted above. This baseline uplink gain is then used when all the remote units are active status (or unmuted) and operating at full gain. Then, the master unit, or some other unit where the remote units are summed together in accordance with the invention, has the ability to increase the uplink gain above the baseline level. Based on a monitored noise condition of the DAS 10, such as based on the number of active status or most status remote units, the invention dynamically adjusts the uplink gain of the DAS 10. In accordance with one aspect of the invention, the master unit 22 is able to increase the uplink signal gain that is applied to uplink signals in response to a decrease in the number of active status remote units 14 that are determined by the DAS system.

Any increase in signal gain would be under the constraint of an upper limit for the gain that may be based on the master unit 22 target noise floor. For example, the upper limit could be based on a selected gain for the case of a single remote that is active status or some other value. The upper limit might also be based on the downlink gain of the DAS. The master unit 22 also decreases the uplink signal gain applied to uplink signals in response to an increase in the number of active status remote units 14. Such a gain decrease is also constrained by the master unit 22 target noise floor. Thus, the master unit 22 may determine the number of active status (e.g., non-muted) remote units 14 based on status updates (e.g., muted or non-muted) received from each remote unit 14 or other parameters. For example, the number of active remote units might be determined by monitoring a parameter, including the data received from each respective remote unit 14. From this determination, the master unit dynamically adjusts the uplink gain to the base station, keeping the overall noise from both the DAS 10 and master unit 22 at or near the target noise floor for the overall DAS. The uplink gain is dynamically increased and decreased as remotes go in and out of mute status (i.e., squelching).

In some embodiments of the invention, detecting signals from the mobile units 16 determining if the remote is in active status or muted status may take place in either the remote unit 14 or in the distribution unit 28, before the signals are combined. Generally, the determination of a muted or active/non-muted status will take place prior to combining all of the signals from the multiple remote units. In one embodiment, a MUTE_STATUS (e.g., mute or active/non-muted) signal may then be reported upstream to the master unit 22 so that the master unit 22 can dynamically adjust the uplink gain. The uplink gain may then be set as a function of the number of remote units 14 that are mute status or conversely that are active status.

FIG. 3 illustrates a schematic diagram representing an exemplary embodiment of a remote unit 14 utilizing RSSI-based monitoring and muting in accordance with one embodiment of the invention. In this embodiment, the received analog signal, such as an uplink signal from a mobile unit, is down-converted with appropriate electronics 34 and digitized by an analog to digital converter ("A/D") 36. The uplink signals may then be directed to the master unit 22 or a distribution unit 28 for further processing. For the purpose of detecting an active status remote unit, the digitized signal may then be filtered with a band or channel filter 38, and then be directed to a detection unit 39. The detection unit may include an exponential averager circuit 40 and comparator circuit 44. The signal is averaged using exponential averager circuit 40. A time constant 42 input to the averager circuit 40 may be adjustable and utilized to change how quickly the averager circuit 40 responds to fast signal changes. The output of the averager circuit 40 is directed to a comparator circuit 44 where it is compared to a predetermined threshold level 46 to determine whether signal traffic from a mobile unit 16 is present in the bandwidth of the filter 38. If the power level of the averaged digital signal 41 is above the threshold level 46, the digital uplink signal 37 may be passed at full gain upstream to either a distribution unit 28 or directly to the master unit 22. If, however, the power level of the averaged signal 41 is less than the threshold level 46, a muting circuit 48 is employed to substantially attenuate the digital uplink signal in order to reduce the noise signal power that is sent to the master unit 22 that will ultimately increase the noise floor at the DAS 10 and the base station 12.

The muting circuit 48 may be controlled by an output status signal 50 (MUTE_STATUS) from the detection circuit, such as from the comparator circuit. The level of the MUTE_STATUS signal will thus determine if the remote unit is active status or mute status and if the uplink signals from the remote unit 14 are muted or left unmuted. In one embodiment of the invention, the status signal 50 for the muting circuit 48 is reported to the master unit 22. The status determination can occur in the remote unit or a distribution unit, and generally will occur before the signals are combined in the uplink direction. The master unit 22 uses this status signal 50, in one embodiment, to determine the number of remote units 14 that are active status or mute status. In accordance with the invention, the master unit 22 then further determines an appropriate uplink gain based on the number of active or muted remote units 14.

Other embodiments of the invention do not utilize RSSI detection and may monitor a particular uplink band or channel parameter for activity from mobile units 16 to determine whether or not to mute the uplink signal from the remote unit 14 based on that activity. For example, in a CDMA system, code detection or pilot signal detection might be used to detect activity and thus, active status, in a remote unit. Still other embodiments employ other methods of detecting uplink signals from the mobile units 16 either in the remote unit 14 itself, or further upstream, such as at the distribution unit 28 or even at the master unit 22. The uplink gain is then actively controlled based on the number of active remote units or muted remote units.

As noted, the baseline uplink gain for the master unit 22 may be determined during system setup of the DAS 10 based on the number of remote units 14 in the system and the path loss from the master unit 22 to the donor base station 12. As described above, the uplink gain is chosen such that the DAS 10 noise floor is below the receive noise floor of the base station 12 by some predetermined amount, for example, approximately 10 dB. This baseline uplink gain may then be used by the master unit 22 when all the remote units 14 of the system are active status and unmuted and operating at full gain.

As one or more remote units 14 are selectively muted or otherwise go inactive, the master unit 22 may dynamically increase the uplink gain by discrete amounts. In one embodiment of the invention, the discrete amount of the increase in uplink gain is reflective of or in relation to the amount of decrease in the noise level from the muting of the one or more mute status remote units. For example, the uplink gain might be dynamically increased by increments that correspond to the specific noise level decrease increments for each remote unit that is muted or that goes inactive. In another embodiment, some other increment for dynamically increasing the gain might be implemented.

In another embodiment, the gain might be dynamically adjusted based on the actual number of remote units or groups of remote units that are muted or mute status. For example, if 1-10 remote units are muted, the gain might be increased by one predetermined increment; if 11-20 are muted, the gain might be increased by another higher increment, and so forth. The uplink gain will be dynamically increased above the baseline level to a maximum level. As noted, the maximum gain level will be set at a level that still attempts to keep the DAS 10 noise floor below the receive noise floor of the base station 12 by some predetermined amount. The upper limit for the uplink gain increase may be determined for the case of a single active status remote unit 14 transmitting at full gain with all of the other remote units 14 muted or mute status. Alternatively, the upper limit for the uplink gain may be determined based on some other value such as, for example, the downlink gain, as noted. As such, the uplink gain from the master unit 22 dynamically increases and decreases as the remote units 14 are muted and unmuted in accordance with one aspect of the invention.

Figure 4:
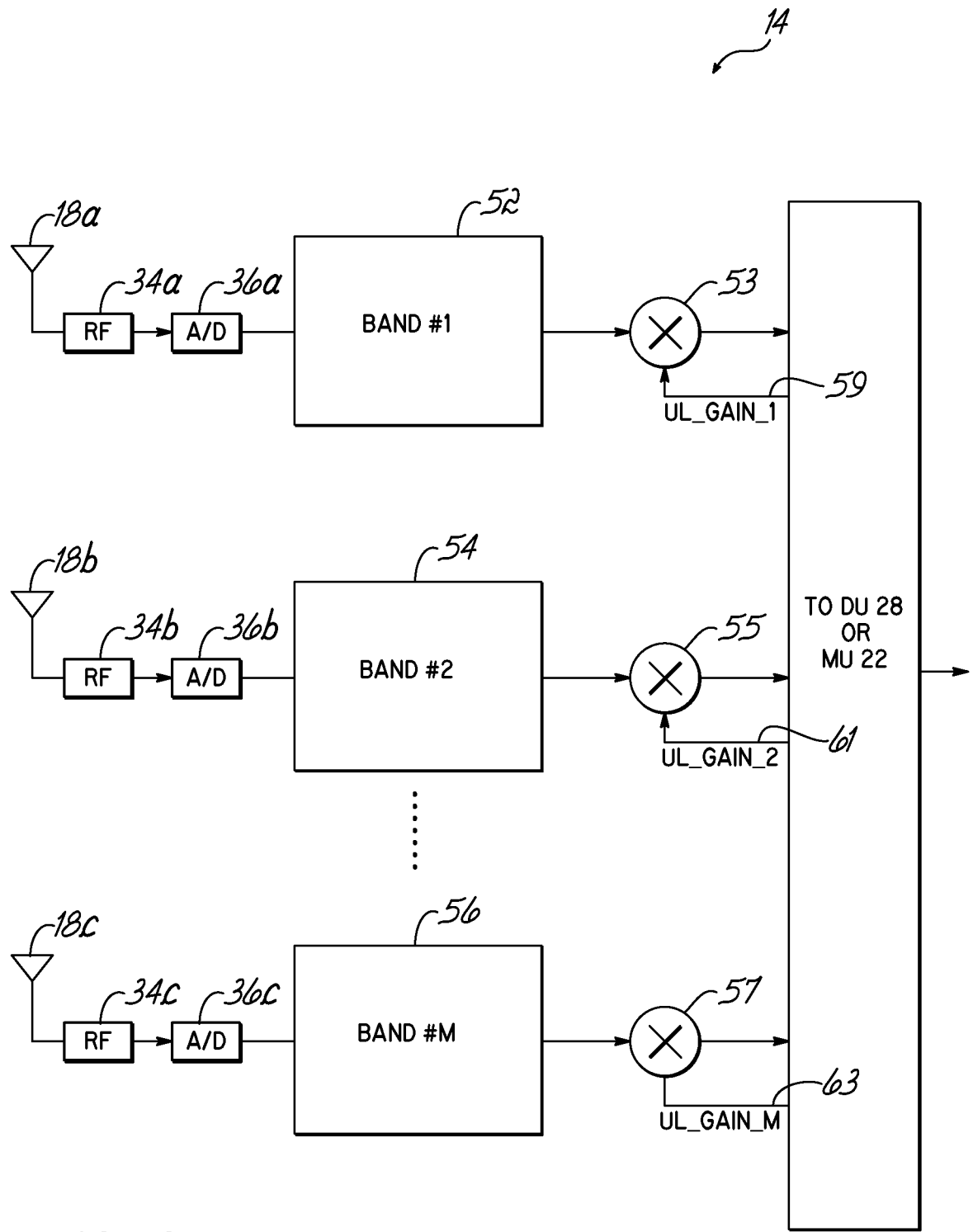
FIG. 4 is a schematic diagram of an alternative embodiment of a remote unit of a DAS system consistent with the invention.
Figure 4A:
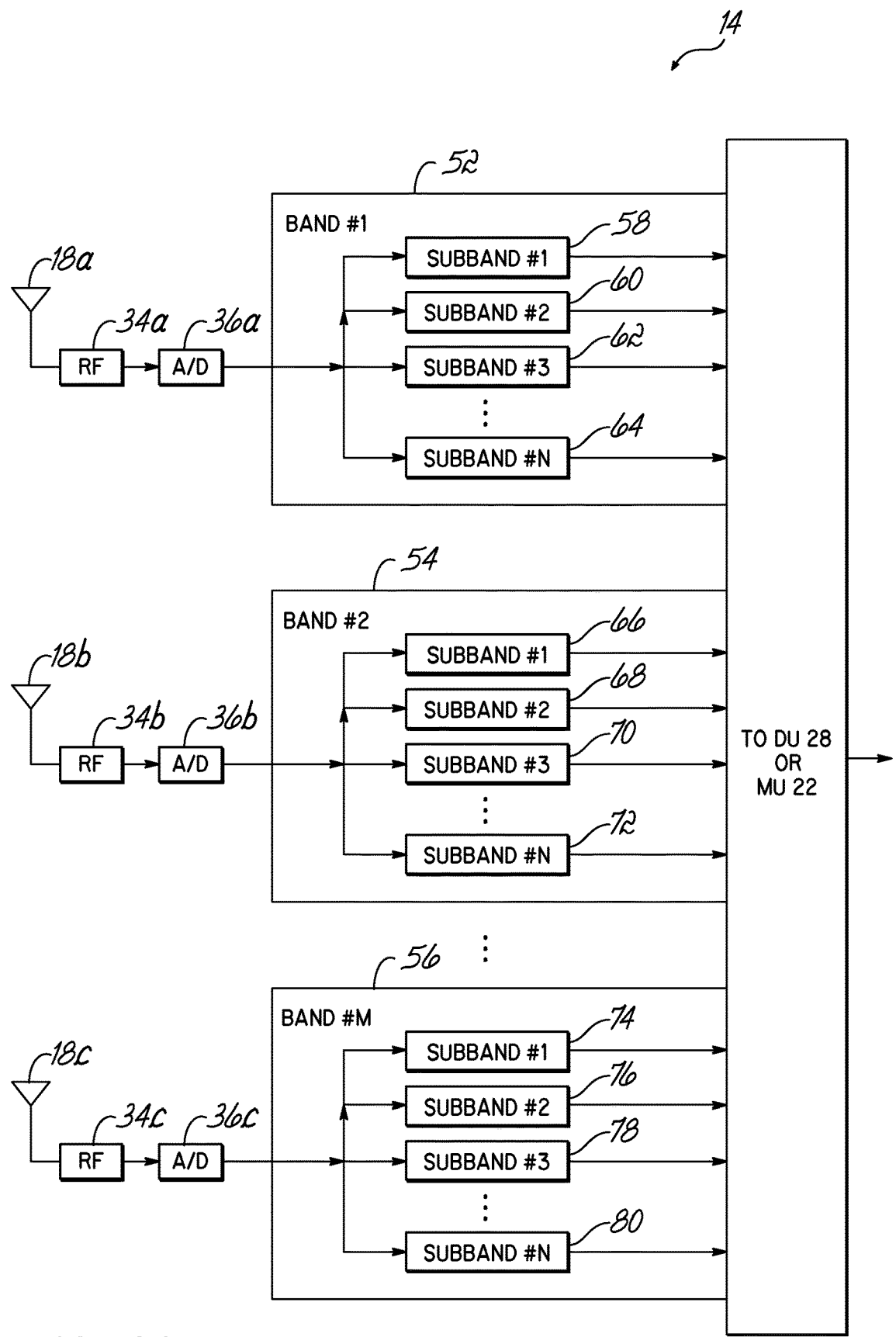
FIG. 4A is a schematic diagram of an alternative embodiment of a remote unit of a DAS system consistent with the invention.

Remote units 14 implemented in the invention may cover one or more frequency bands, which may or may not be in use at a particular time. However, activity in only one of the specific bands for a remote unit may be sufficient to unmute a remote unit 14. This will then contribute to the noise related to all of the bands, even when many of the frequency bands are unused at a particular time. Embodiments of the invention address this situation by muting or squelching individual bands within a remote unit 14. For example, remote unit 14 may cover multiple frequency bands (1-M) 52, 54, and 56 as seen in FIG. 4. Some of the bands 52, 54, 56 in the remote unit 14 may be selectively muted while other bands are not. Additionally, within each band there can be various subbands defined 58-80, as illustrated in FIG. 4A. In some embodiments, selective muting may occur at the subband level. Thus, in addition to adjusting the DAS uplink gain based on a remote unit 14 as a whole, the uplink gain may also alternatively be dynamically varied from one band to the next and/or from one subband to the next based on the mute status or active status of each remote unit with respect to the particular band or subband. In some embodiments, the subband bandwidth may be a single channel wide (e.g. for a GSM channel, the channel bandwidth is approximately 200 kHz, for UMTS the channel bandwidth is approximately 5 MHz). In other embodiments, a subband may encompass multiple channels or other bandwidths.

Figure 3B:
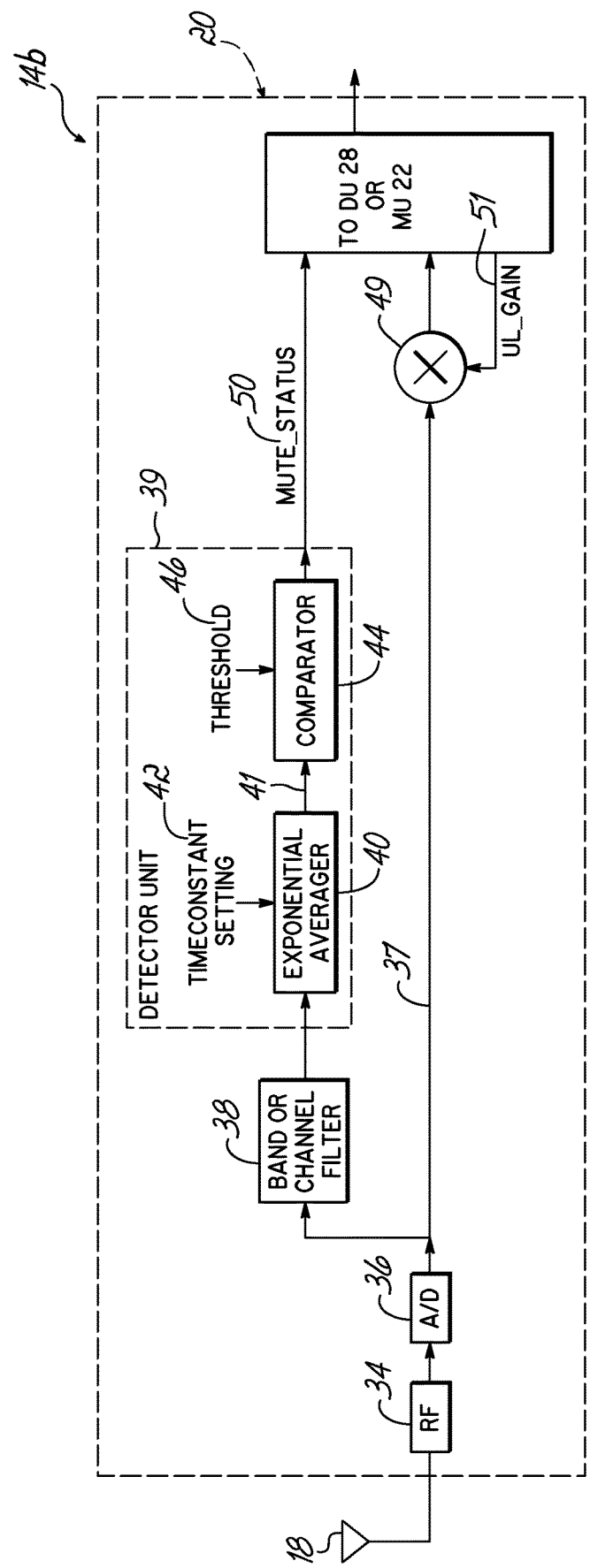
FIG. 3B is a schematic diagram of another alternative embodiment of a remote unit of a DAS system, consistent with the invention.
Figure 5:
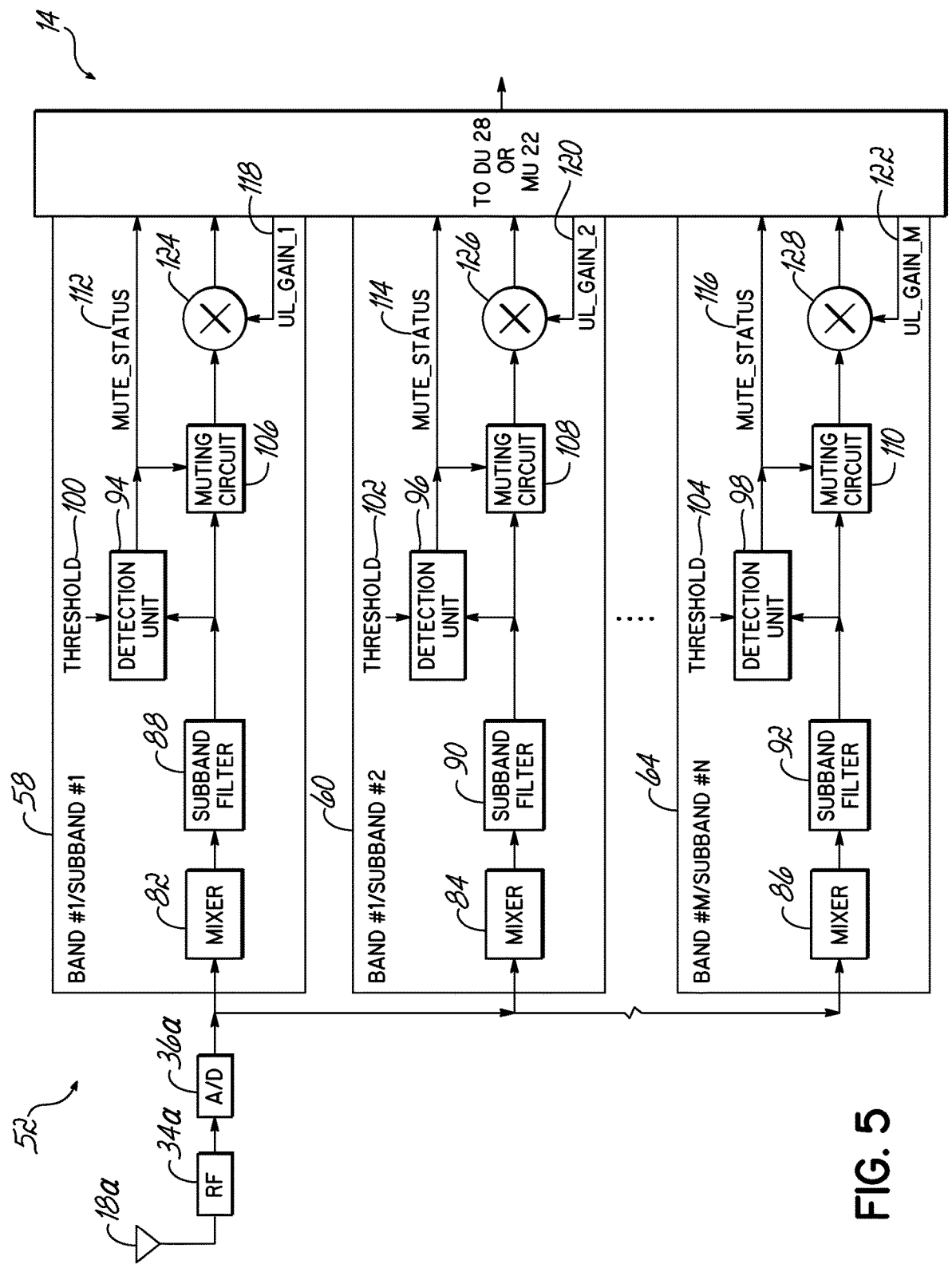
FIG. 5 is a schematic diagram of a portion of a remote unit consistent with the invention.

As illustrated in FIG. 4A, band 52 includes subbands 58, 60, 62, 64; band 54 includes subbands 66, 68, 70, 72; band 56 includes subbands 74, 76, 78, 80. Signals for each band 52, 54, 56 may be received at respective antennas 18a, 18b, 18c of the remote unit 14, down converted with appropriate electronics 34a-c and converted to digital with A/D converters 36a-c. In some embodiments, depending upon the bands and subbands, various bands/subbands might share a single antenna. Therefore, the invention is not limited to having a dedicated antenna for each band or subband. For the purpose of illustrating one embodiment of the invention; FIGS. 4 and 4A illustrate a specific antenna 18a-c, for each noted band or group of subbands. As illustrated in FIG. 5, the circuits 58, 60, 62 and 64 defining the subbands of band 52 include mixer currents 82, 84, 86 and subband filters 88, 90, 92 that separate the full band 52 into smaller subband widths 58, 60, 62, 64. Detection units 94, 96, 98 may be configured to only detect mobile unit 16 activity within each corresponding subband 58, 60, 64 bandwidth. Detection units 94, 96, 98, for example, might be configured similar to the detection unit 39 from the circuit, as shown in FIG. 3. As with embodiments above, the detection units 94, 96, 98 may compare the received uplink signals to a predetermined respective threshold signal level 100, 102, 104 to determine whether a traffic signal from mobile unit 16 is present in the bandwidth of the corresponding subband 58, 60, 64. If the signals or power levels within the subband 58, 60, 64 are above the respective threshold 100, 102, 104, thus indicating uplink traffic in the subband, the output MUTE_STATUS, 112, 114, 116 of the detection units 94, 96, 98 indicates that the remote unit signals are not to be muted (e.g., mute status) but rather, have uplink signals and are, therefore, active status. The respective muting circuits 106, 108, 110 are then operated so that the signals may be passed at full gain for the subband 58, 60, 64 upstream to either a distribution unit 28 or directly to the master unit 22. If the uplink signals associated with the subbands are below the threshold 100, 102, 104, and the remote units are mute status, the muting circuits 106, 108, 110 may be utilized to significantly attenuate or mute the signals associated with the subbands and reduce the noise. As noted, the mute status may be simply based upon lack of signal traffic, and may not require or use muting circuits to actually mute or squelch any signals from the remote unit. For example, as shown in FIG. 3B, a specific muting circuit is not implemented.

The MUTE_STATUS signals 112, 114, 116 of each of the subbands 58, 60, 64 in each remote unit 14 may also be reported to the master unit 22, similar to the embodiments discussed above. FIG. 5 illustrates circuitry associated with band 52 and subbands 58, 60 and 64. Similar circuitry might be implemented for the various other bands 54 and 56 and their respective subbands as illustrated in FIGS. 4 and 4A.

In accordance with one embodiment of the invention, the MUTE_STATUS signal of the various subbands might be forwarded to the distribution unit which determines how many subbands are muted before various of the uplink signals from the remote units are combined to be forwarded to the master unit. The number of subbands that are muted may then be reported to the master unit. The master unit 22 may then dynamically adjust the uplink gain associated with the various muted subbands. That uplink gain may then affect all of the subband signals from the individual remote units. In such an embodiment, the master unit would have appropriate uplink gain circuitry that is dynamically adjusted to achieve the desired increased uplink gain based upon muting one or more of the remote units or one or more of the subbands from a remote unit. As noted above, the invention might provide an incremental increase in uplink gain that is reflective of the incremental decrease in noise from a particularly muted subband. Alternatively, depending upon the number of subbands that are muted, the uplink gain might be increased by some other appropriate increment. Accordingly, the invention is not limited to the specific dynamic adjustment increments for the uplink gain based upon the mute status or active status of one or more remote units or one or more subbands of a remote unit.

In an alternative embodiment of the invention, the dynamic adjustment to the uplink gain may take place in a distribution unit 28 as illustrated in FIG. 2B upon determining the number of remote units and number of subbands that are muted, such as, for example, based upon the MUTE_STATUS signal from each remote unit. In such a case, the uplink gain is dynamically adjusted as noted above, with increases and decreases based upon active status or mute status or mute status remote units.

In a further alternative embodiment of the invention, the dynamic adjustment of the uplink gain may occur in the remote unit.

For example, referring to FIGS. 3A and 3B, remote unit 14a might incorporate gain circuitry 49 to individually and dynamically adjust the gain of the uplink signals associated with remote unit 14a. To that end, the gain circuitry 49 might be controlled by one or more signals 51 indicated in FIG. 3A as UL_GAIN. The UL_GAIN signal(s) 51 may be directed to the remote unit 14a from the distribution unit 28 or master unit 22 in that way, the uplink gain of individual signals from a remote unit might be affected.

In still another embodiment of the invention directed to a remote unit which handles multiple bands or multiple subbands as illustrated in FIGS. 4, 4A and 5, the gain might also be dynamically adjusted at the remote unit. For example, referring to FIG. 4, remote unit 14 might handle bands 1-M through appropriate circuitry 52, 54 and 56 for handling the signals of the respective bands. Gain circuitry 53, 55 and 57 associated with the respective bands is utilized to dynamically adjust the uplink gain associated with the respective band for the remote unit 14. As such, to provide the dynamic adjustment of a gain, one or more control signals might be directed to the gain circuitry of a remote unit from the distribution unit or master unit. That is, once the MUTE_STATUS of the various remotes and the various bands of the remotes is determined, appropriate control signals may be utilized and directed to a particular remote unit 14 to affect the uplink gain circuitry associated with one or more bands handled by the remote unit. Referring to FIG. 4, such signal(s) are indicated as UL_GAIN_1, UL_GAIN_2, and UL_GAIN_M, and respectively by reference numerals 59, 61 and 63. In that way, the uplink gain might be dynamically adjusted individually for certain bands of a remote unit based upon the number of remote units that are muted or the number of bands that are muted in the DAS.

In still another alternative embodiment of the invention, dynamic gain adjustment might be made for each subband based upon muting conditions for the remote units/bands/subbands as noted above. Referring to FIG. 5, the subband circuitry 58, 60, 64 might include respective adjustable gain circuitry 124, 126, 128 as illustrated. Depending upon the MUTE_STATUS of a particular subband, or the total number of subbands that are muted in the system, the gain circuitry 124, 126, 128 might be dynamically adjusted to change the uplink gain. For example, based upon the particular MUTE_STATUS signal, for a particular subband, the respective gain circuitry might be adjusted. As noted above, the dynamic gain adjustment might be made incrementally for each subband that is muted or might be adjusted based upon the numbers of subbands that are muted, for example. To that end, appropriate control signals UL_GAIN_1, UL_GAIN_2 and UL_GAIN_M illustrated respectively by reference numerals 118, 120 and 122 in FIG. 5 may be directed to the remote unit illustrated in FIG. 5 by either the distribution unit 28 or a master unit 22. The gains then provided by the circuits 124, 126 and 128 are applied to the specific subband signals associated with the subbands 58, 60 and 64.

In accordance with another aspect of the invention, utilization of separate muting circuitry for a remote unit, or a specific band or subband may not be necessary if gain circuitry is implemented for that specific remote unit, band or subband. If it is determined that a particular remote unit or band/subband is not handling uplink traffic signals, such as uplink signals from a mobile unit, the specific uplink gain for the adjustable gain circuitry of the remote unit might be set to zero for a particular remote unit or selected bands or subbands in order to mute that remote unit or band or subband.

Referring to FIG. 3B, remote unit circuitry is illustrated wherein a muting circuit is not implemented, but rather the adjustable gain circuitry 49 is utilized to effectively create a mute condition at the remote unit 14b. That is, based upon the MUTE_STATUS signal directed to a distribution unit or master unit, the gain circuitry 49 may be appropriately adjusted utilizing a UL_GAIN signal 51 to set the uplink gain for the remote unit 14b to zero or effectively low enough to establish a muting condition (mute status) for that remote unit 14b. Similarly, the muting circuitry might be eliminated with respect to the band and subband circuits of FIGS. 4 and 5 so that muting is handled primarily through control of the adjustable gain circuitry in those circuits.

While various of the illustrated examples show the signal detection and muting and gain adjustment handled in the remote units, in alternative embodiments, subbanding, signal detection, and muting may occur in the remote unit 14 or alternatively in distribution unit 28. Additionally, in other embodiments, the dividing the incoming signals into bands and/or subbands may be performed in the remote unit 14 while the muting and detection for the remote or bands/subbands may be performed either in the distribution unit 28 or even at the master unit 22. The subbanding of the signals and detection to determine muting may occur in any of the components of the DAS 10 as long as they take place prior to the various remote and band/subband signals being combined in the uplink direction for transmission to the base station 12.

In accordance with the invention, the uplink gain within a distributed antenna system or other signal repeating system is dynamically adjusted based upon monitoring a noise condition of the distributed antenna system. More specifically, the invention monitors the activity level (mobile device traffic) and MUTE_STATUS (mute status/active status) associated with remote units in the system. The determination of activity level and status may be made based upon the remote unit itself, or with respect to a band or subband that is handled by the remote unit. As the MUTE_STATUS of the remote unit and/or the bands and subbands of the remote unit indicate that the remote unit or the bands/subbands are mute status (i.e., no activity or uplink signals from mobile devices) the uplink gain within the system is dynamically increased. The uplink gain might be increased at the master unit, at a distribution unit, or individually at the remote units. Furthermore, the uplink gain might be dynamically adjusted based upon the specific bands or subbands of a remote unit. The dynamic adjustment in the uplink gain may occur in increments. The increments may be related to the number of specific elements that are mute status in the system, including the remote unit, a band of a remote unit or a subband of a remote unit. Alternatively, the increments might be determined by the groups of elements (e.g., 10 remote units) that are mute status or other suitable criteria associated with the muted elements in order to provide the incremental dynamic adjustment in the uplink gain. As discussed with the various examples set forth herein, as more mute status (less active status) elements in the system are detected, the uplink gain is dynamically increased. It will be understood as well, that as activity is detected in a remote unit or band/subband and the specific element is unmuted or active status, the uplink gain is dynamically decreased in order to ensure a suitable noise floor for the overall system so that it does not detrimentally affect the noise floor of the base station. The dynamic increase of the uplink gain might be limited by an upper limit as determined for the system, while the dynamic decrease of the uplink gain might be constrained by a lower limit.

For example, if an overall system includes 100 remotes and 90 of the 100 remotes are muted, the noise floor of the overall system may drop 10 dB. Accordingly, the uplink gain for the system might be dynamically adjusted to increase 10 dB in total and still remain at a suitable level so as not to detrimentally affect the base station's noise floor. Once the uplink gain has been increased, the mobile units 16 can, in turn, reduce their gain by roughly the same amount of uplink gain increase at the signal repeating system or DAS and still maintain the same carrier-to-noise carrier ratio (C/N) at the base station.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system comprising:
  circuitry configured to:
    communicate with a base station; and adjust an uplink gain applied to uplink signals communicated from the system to the base station based on an evaluation of (1) a noise contribution from the system that is presented to the base station and (2) a receive noise floor for the base station.

2. The system of claim 1, wherein the circuitry is configured to wirelessly communicate with the base station.

3. The system of claim 1, wherein the circuitry is further configured to:
adjust the uplink gain applied to the uplink signals to establish a target noise floor for the noise contribution from the system.

4. The system of claim 3, wherein the circuitry is further configured to:
evaluate a path loss from the system to the base station to establish the target noise floor.

5. The system of claim 1, wherein the circuitry is further configured to:
adjust the uplink gain to make the noise contribution from the system lower than the receive noise floor of the base station.

6. The system of claim 5, wherein the circuitry is further configured to:
adjust the uplink gain to make at least one of (1) the noise contribution from the system and (2) the noise contribution from the system plus the path loss to the base station lower than the receive noise floor of the base station by a threshold amount.

7. The system of claim 1, wherein the circuitry is further configured to:
evaluate a path loss from the system to the base station; and
adjust the uplink gain to make the noise contribution from the system plus the path loss to the base station lower than the receive noise floor of the base station.

8. The system of claim 1, wherein the system includes:
a master unit; and
a plurality of remote units communicatively coupled to the master unit.

9. The system of claim 1, wherein the circuitry is further configured to:
reduce the uplink noise in the system by attenuating or muting signals within the system.

10. The system of claim 1, wherein the circuitry is configured to adjust the uplink gain applied to uplink signals communicated from the system to the base station by:
increasing the uplink gain in response to a decrease in the noise floor of the system; and
decreasing the uplink gain in response to an increase in the noise floor of the system.

11. A system, comprising:
a repeater configured to communicate with a base station;
circuitry configured to:
adjust a gain applied to uplink signals communicated from the system to the base station based on (1) a noise contribution from the system that is presented to the base station; and (2) a receive noise floor for the base station.

12. The system of claim 11, wherein the repeater is configured to wirelessly communicate with the base station.

13. The system of claim 12, wherein the circuitry is configured to at least one of:
adjust the uplink gain that is applied to uplink signals to establish a target noise floor for the noise contribution from the system;
evaluate a path loss from the system to the base station to establish the target noise floor; and
adjust the uplink gain to make the noise contribution from the system lower than the receive noise floor of the base station.

14. The system of claim 12, wherein the system includes a master unit communicatively coupled to a plurality of remote units.

15. The system of claim 12, wherein the circuitry is further configured to:
reduce the uplink noise in the system by attenuating or muting signals within the system.

16. A method of controlling uplink signal power in a system communicating with a base station, the method comprising:
adjusting an uplink gain applied to uplink signals communicated from the system to the base station based on (1) a noise contribution from the system that is presented to the base station; and (2) a receive noise floor for the base station.

17. The method of claim 16, further comprising at least one of:
adjusting the uplink gain that is applied to uplink signals to establish a target noise floor for the noise contribution from the system;
evaluating a path loss from the system to the base station to establish the target noise floor; and
adjusting the uplink gain to make the noise contribution from the system lower than the receive noise floor of the base station.

18. The method of claim 16, further comprising:
adjusting the uplink gain to make the noise contribution from the system lower than the receive noise floor of the base station by a threshold amount.

19. The method of claim 16, further comprising:
evaluating a path loss from the system to the base station; and
adjusting the uplink gain to make the noise contribution from the system plus the path loss to the base station lower than the receive noise floor of the base station by a threshold amount.

20. The method of claim 16, further comprising:
reducing the uplink noise in the system by attenuating or muting signals within the system.

* * * * *